United States Patent
Lall et al.

(10) Patent No.: US 8,135,397 B1
(45) Date of Patent: Mar. 13, 2012

(54) PREDICTING USER EXPERIENCE ON A COMMUNICATION NETWORK

(75) Inventors: Abhishek Lall, Manhattan, KS (US);
Anil H. Singh, Overland Park, KS (US);
Larry D. Pearce, Stilwell, KS (US);
Jorge T. Climaco, Overland Park, KS (US); Samuel B. Odedina, Chula Vista, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 540 days.

(21) Appl. No.: 12/404,405

(22) Filed: Mar. 16, 2009

(51) Int. Cl.
*H04W 24/00* (2009.01)

(52) U.S. Cl. ..... 455/425; 455/423; 455/424; 455/422.1; 370/331; 370/332; 370/328

(58) Field of Classification Search ............... 455/414.1, 455/423–425, 404.2, 414.2–414.4, 456.1–456.6, 455/67.11, 422.1; 370/331, 332, 328
See application file for complete search history.

(56) References Cited

U.S. PATENT DOCUMENTS

| | | | |
|---|---|---|---|
| 5,799,154 A * | 8/1998 | Kuriyan | 709/223 |
| 6,032,105 A * | 2/2000 | Lee et al. | 702/57 |
| 6,094,580 A | 7/2000 | Yu et al. | |
| 2003/0039233 A1 * | 2/2003 | Satt et al. | 370/338 |
| 2004/0165561 A1 * | 8/2004 | Chiou et al. | 370/338 |
| 2004/0214577 A1 * | 10/2004 | Borst et al. | 455/446 |
| 2006/0217116 A1 * | 9/2006 | Cassett et al. | 455/423 |
| 2006/0276195 A1 * | 12/2006 | Nordling | 455/446 |
| 2007/0091807 A1 | 4/2007 | Yoshikawa | |

* cited by examiner

*Primary Examiner* — Marivelisse Santiago Cordero
*Assistant Examiner* — Dung Hong

(57) ABSTRACT

A wireless communication system for monitoring a communication service comprises a first set of communication devices located in a first set of geographic areas configured to receive the communication service and determine first performance data. A communication network is configured to determine first network data for the communication service. A service monitoring system is configured to process the first performance data and the first network data to generate a communication service model. A second set of communication devices located in a second set of geographic areas is configured to receive the communication service and determine second performance data. The communication network is configured to determine second network data. The service monitoring system is configured to process the second network data with the communication service model to generate model performance data, and compare the model performance data to the second performance data to validate the communication service model.

20 Claims, 5 Drawing Sheets

PREDICTING USER EXPERIENCE ON A COMMUNICATION NETWORK

TECHNICAL BACKGROUND

Modern communication service providers frequently offer a wide variety of communications services to users. For example, users often purchase, subscribe to, or otherwise obtain voice calling, text messaging, or high speed data access services from communication service providers. In addition, a service provider may claim a certain level of data transfer speed when marketing or branding a high speed data access service.

A service provider making such a speed claim with regard to an offered high speed data service may desire verification of the actual experienced data rates of a user. While the service provider may monitor certain network conditions from the perspective of the communication network, such measurements merely provide a rough estimate of actual user experience. Unfortunately, existing methods to determine user experience, such as drive testing the network or providing customer satisfaction surveys, are not exhaustive enough to capture a significant data set that accurately represents the entire network.

OVERVIEW

A method of monitoring a wireless communication service provided by a wireless communication network to wireless communication devices in a plurality of geographic areas comprises, in a first set of the wireless communication devices located in a first set of the geographic areas, receiving the wireless communication service and determining first performance data for the wireless communication service. In the wireless communication network, providing the wireless communication service to the first set of the wireless communication devices and determining first network data for the wireless communication service provided to the first set of the wireless communication devices. In a service monitoring system, processing the first performance data and the first network data to generate a wireless communication service model. In a second set of the wireless communication devices located in a second set of the geographic areas, receiving the wireless communication service and determining second performance data for the wireless communication service. In the wireless communication network, providing the wireless communication service to the second set of the wireless communication devices and determining second network data for the wireless communication service provided to the second set of the wireless communication devices. In the service monitoring system, processing the second network data with the wireless communication service model to generate model performance data for the wireless communication service provided to the second set of the wireless communication devices, and comparing the model performance data to the second performance data to validate the wireless communication service model. In the wireless communication network, providing the wireless communication service to a third set of the wireless communication devices located in a third set of the geographic areas and determining third network data for the wireless communication service provided to the third set of the wireless communication devices. In the service monitoring system, processing the third network data with the wireless communication service model to generate validated performance data for the wireless communication service provided to the third set of the wireless communication devices.

A wireless communication system for monitoring a wireless communication service provided by a wireless communication network to wireless communication devices in a plurality of geographic areas comprises a first set of the wireless communication devices located in a first set of the geographic areas configured to receive the wireless communication service and determine first performance data for the wireless communication service. The wireless communication network is configured to provide the wireless communication service to the first set of the wireless communication devices and determine first network data for the wireless communication service provided to the first set of the wireless communication devices. A service monitoring system is configured to process the first performance data and the first network data to generate a wireless communication service model. A second set of the wireless communication devices located in a second set of the geographic areas is configured to receive the wireless communication service and determine second performance data for the wireless communication service. The wireless communication network is configured to provide the wireless communication service to the second set of the wireless communication devices and determine second network data for the wireless communication service provided to the second set of the wireless communication devices. The service monitoring system is configured to process the second network data with the wireless communication service model to generate model performance data for the wireless communication service provided to the second set of the wireless communication devices, and compare the model performance data to the second performance data to validate the wireless communication service model. The wireless communication network is configured to provide the wireless communication service to a third set of the wireless communication devices located in a third set of the geographic areas and determine third network data for the wireless communication service provided to the third set of the wireless communication devices. The service monitoring system is configured to process the third network data with the wireless communication service model to generate validated performance data for the wireless communication service provided to the third set of the wireless communication devices.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
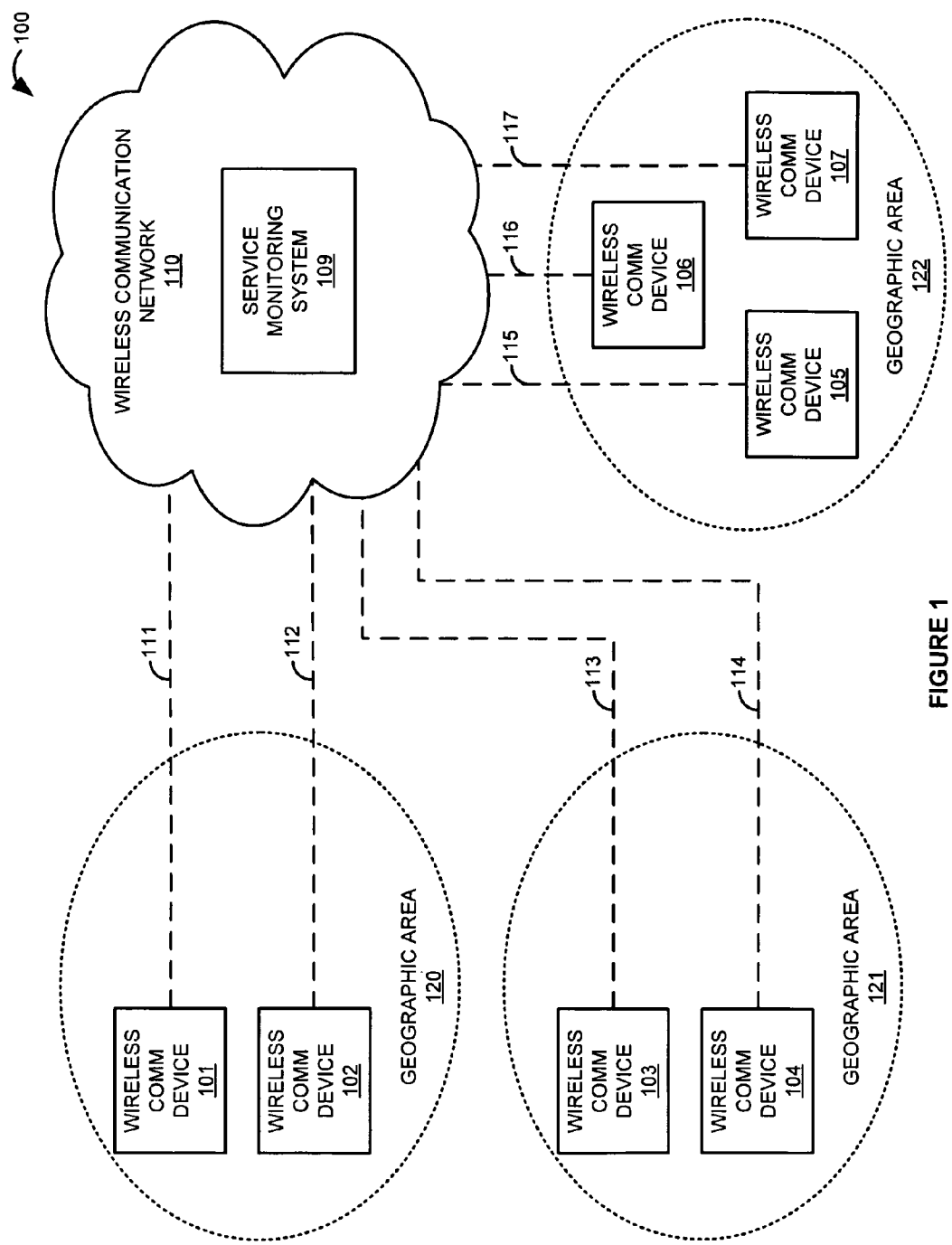
FIG. 1 is a block diagram that illustrates a wireless communication system.

FIG. 1 illustrates wireless communication system 100. Wireless communication system 100 comprises wireless communication network 110, and wireless communication devices 101-107 within respective geographic areas 120-122. Wireless communication network 110 comprises service monitoring system 109. Wireless communication devices 101-107 communicate with wireless communication network 110 over respective wireless communication links 111-117. Note that the number of wireless devices depicted in FIG. 1 would typically be greater, but only a limited number are shown herein for clarity.

Geographic areas 120-122 comprise areas of land or water with approximate boundaries as indicated by the dotted lines on FIG. 1. Geographic area 120 comprises a first set of wireless communication devices 101-102, geographic area 121 comprises a second set of wireless communication devices 103-104, and geographic area 122 comprises a third set of wireless communication devices 105-107. As depicted in FIG. 1, the three sets of wireless communication devices 101-102, 103-104, and 105-107 within each respective geographic area 120-122 are in physically distinct locations. However, two or more wireless communication devices could be physically adjacent or located in the same city, county, or other governmental jurisdiction, yet still considered to have separate locations within separate geographic areas 120-122. Further, a geographic area could comprise multiple, non-contiguous areas of land or water and still be considered a single geographic area.

Wireless communication devices 101-107 each comprise any device that has wireless communication connectivity. Wireless communication devices 101-107 comprise hardware and circuitry programmed to function as a telecommunications device. For example, wireless communication devices 101-107 could comprise telephones, transceivers, smartphones, mobile phones, cellular phones, personal digital assistants (PDAs), personal communicators, handheld game consoles, Internet access devices, personal computers (PCs), Ultra-Mobile personal computers (UMPCs), handheld televisions, or some other consumer apparatus with wireless communication capabilities—including combinations thereof.

Wireless communication network 110 may comprise any wireless network that provides communication connectivity for wireless devices 101-107 to send and receive data. Wireless communication network 110 comprises base stations, wireless communication nodes, telephony switches, internet routers, network gateways, computer systems, communication links, or some other type of communication equipment—including combinations thereof. Wireless network protocols that may be utilized by wireless communication network 110 may comprise Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), Wi-Fi, Internet, telephony, or any other wireless network protocol that facilitates communication between communication network 110 and wireless devices 101-107.

The wireless communication links 111-117 between respective wireless communication devices 101-107 and communication network 110 use the air or space as the transport media. Wireless communication links 111-117 may use various protocols, such as CDMA 1xRTT, GSM, UMTS, HSPA, EV-DO, EV-DO rev. A, 3GPP LTE, WiMAX, Wi-Fi, Internet, telephony, or some other communication format—including combinations thereof.

Service monitoring system 109 comprises a computer system. Service monitoring system 109 may be a discrete system or may be integrated within other systems—including other systems within wireless communication network 110. Service monitoring system 109 may reside in a single device or may be distributed across multiple devices.

Figure 2A:
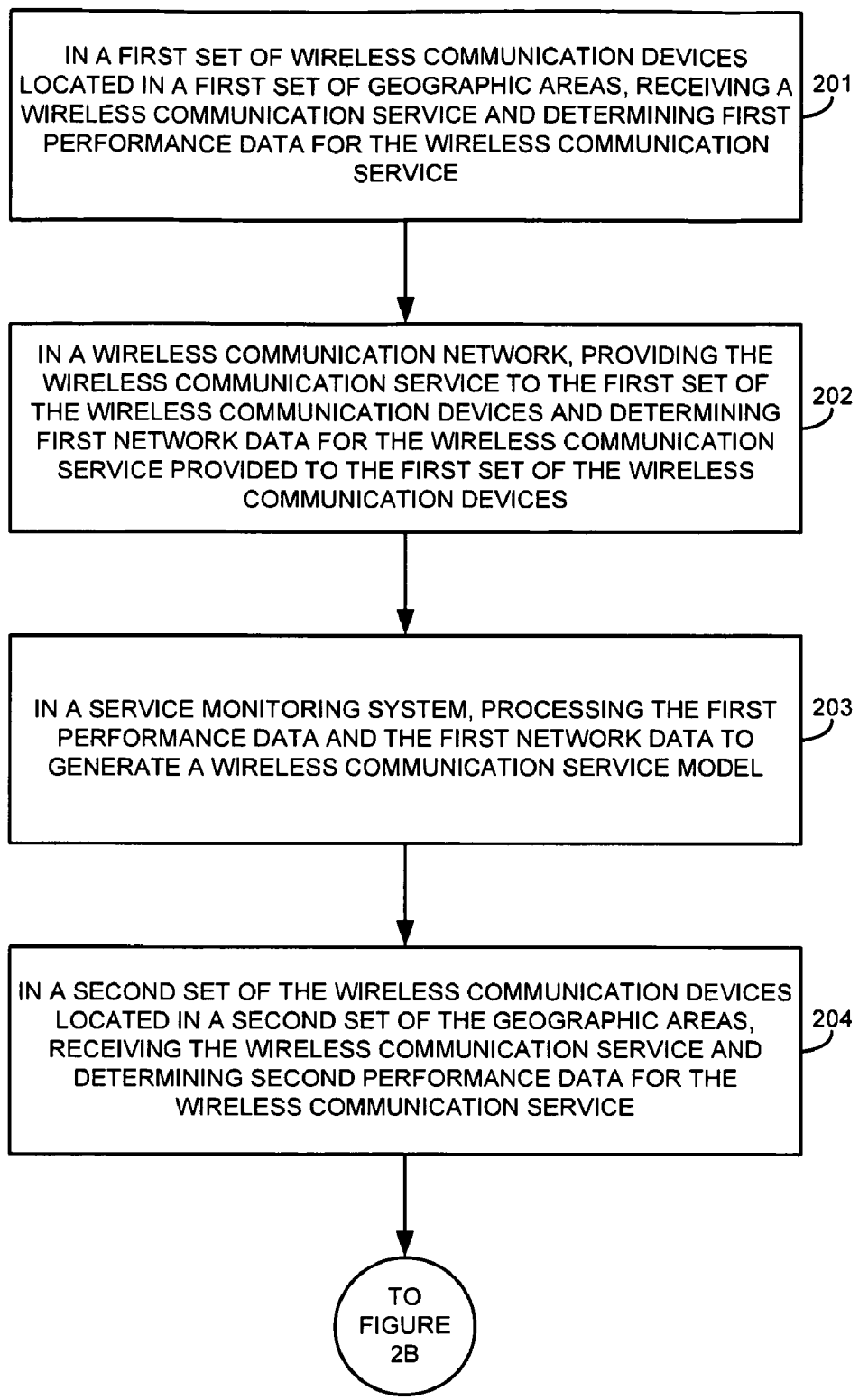
FIG. 2A is a flow diagram that illustrates a method of operating the wireless communication system.

FIG. 2A is a flow diagram that illustrates a method of operating wireless communication system 100. The method described herein allows a service provider to monitor a wireless communication service provided by wireless communication network 110 to wireless communication devices 101-107 in a plurality of geographic areas 120-122. The steps of the method are shown parenthetically.

The method begins with a first set of wireless communication devices 101-102 located in a first set of geographic areas 120 receiving a wireless communication service and determining first performance data for the wireless communication service (201). The first performance data for the wireless communication service could comprises a data transfer rate or a bandwidth measurement, such as kilobits per second. The first set of wireless communication devices 101-102 may perform data transfers on a periodic schedule, for example on an hourly basis. The first set of wireless communication devices 101-102 may perform multiple data transfers over multiple protocols, such as file transfer protocol (ftp) or hypertext transfer protocol (http). For example, wireless communication devices 101-102 could stream video content over http from wireless communication network 110 and report the data transfer rate to service monitoring system 109. In another example, wireless communication devices 101-102 could upload a file to communication network 110 and determine the bandwidth of the file transfers. In addition, the first performance data could comprise a timestamp indicating a time when a data transfer occurs. The timestamp could then be used by wireless communication network 110 to determine network conditions at the time of the data transfer.

Referring again to FIG. 2A, wireless communication network 110 provides the wireless communication service to the first set of the wireless communication devices 101-102 and determines first network data for the wireless communication service provided to the first set of the wireless communication devices 101-102 (202). In one example, wireless communication network 110 may determine the first network data for the wireless communication service provided to the first set of the wireless communication devices 101-102 by determining the network data at the timestamp included in the first performance data from the first set of the wireless communication devices 101-102. Alternatively, wireless communication network 110 may determine the first network data for the wireless communication service provided to the first set of the wireless communication devices 101-102 by determining the first network data simultaneously while providing the wireless communication service to the first set of the wireless communication devices 101-102.

The first network data comprises network operational measurements (OMs), such as Radio Access Network (RAN) OMs. For example, the first network data could comprise forward link slot utilization, which comprises the number of timeslots used in the forward link of wireless communication network 110 while the first set of wireless communication devices 101-102 were receiving the wireless communication service. The forward link slot utilization could comprise the average overhead and data for a sector serving one or more of the first set of wireless communication devices 101-102.

The first network data could also comprise an amount of forward link data transmitted, which may be determined by the amount of megabytes transmitted over the forward link of wireless communication network 110, for example. The first network data could also comprise an average number of connections or users, wherein the average numbers of connections may be determined both per cell site or per sector, or both.

The first network data could also comprise a backhaul link load. As known to one of skill in the art, a backhaul link comprises any intermediate communication link over which a base station exchanges communications with other elements in wireless communication network 110. A backhaul link may comprise a wired or wireless connection, for example T-carrier links such as T1/T3, synchronous transport module (STM-1) links, optical carrier (OC) links such as OC-3, point-to-point microwave radio relay transmission links, worldwide interoperability for microwave access (WiMAX) links, and Ethernet links. For example, if a T1 link is used as a backhaul link, the backhaul link load could comprise an amount of T1 utilization.

The first network data could also comprise an amount of contention, wherein the amount of contention comprises a Number of Scheduled Eligible Users (NSEUs). The NSEUs are the number of users utilizing a sector or cell site simultaneously. The amount of contention, or NSEUs, may be determined per cell site or per sector, or both.

Returning to the method of FIG. 2A, service monitoring system 109 processes the first performance data and the first network data to generate a wireless communication service model (203). The wireless communication service model comprises a mathematical model that may be used to predict the application layer experience of users connected to wireless communication network 110. The wireless communication service model is generated by using the first performance data and the first network data to train a nonlinear predictive model using curve fitting techniques such as regression analysis and best fit. The first performance data and the first network data may be normalized prior to generating the wireless communication service model. Normalizing the first performance data and the first network data comprises assigning different weights to the various statistics within the first performance data and the first network data.

A second set of wireless communication devices 103-104 located in a second set of geographic areas 121 receive a wireless communication service and determine second performance data for the wireless communication service (204). The second performance data for the wireless communication service could comprises a data transfer rate or a bandwidth measurement, such as kilobits per second. The second set of wireless communication devices 103-104 may perform multiple data transfers over multiple protocols, such as ftp or http. For example, wireless communication devices 103-104 could stream video content over http from wireless communication network 110 and report the data transfer rate to service monitoring system 109. In another example, wireless communication devices 103-104 could upload a file to communication network 110 and determine the bandwidth of the file transfers. In addition, the second performance data could comprise a timestamp indicating a time when a data transfer occurs. The timestamp could then be used by wireless communication network 110 to determine network conditions at the time of the data transfer.

Figure 2B:
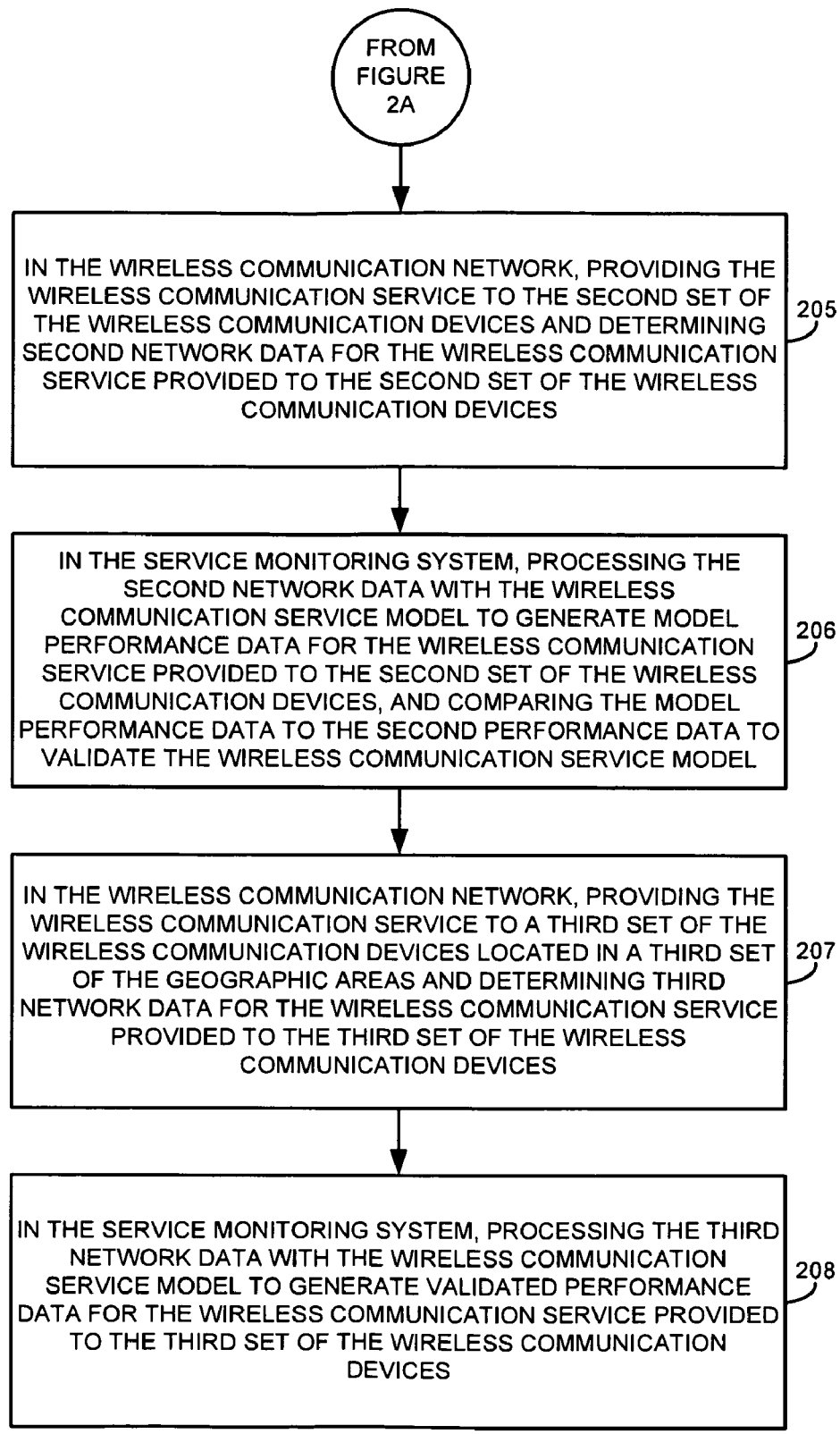
FIG. 2B is a continuation of the flow diagram of FIG. 2A that illustrates a method of operating the wireless communication system.

The operation is continued with the steps presented in FIG. 2B.

FIG. 2B is a continuation of the flow diagram of FIG. 2A that illustrates a method of operating wireless communication system 100. Wireless communication network 110 provides the wireless communication service to the second set of the wireless communication devices 103-104 and determines second network data for the wireless communication service provided to the second set of the wireless communication devices 103-104 (205). In one example, wireless communication network 110 may determine the second network data for the wireless communication service provided to the second set of the wireless communication devices 103-104 by determining the network data at the timestamp included in the second performance data from the second set of the wireless communication devices 103-104. Alternatively, wireless communication network 110 may determine the second network data for the wireless communication service provided to the second set of the wireless communication devices 103-104 by determining the second network data simultaneously while providing the wireless communication service to the second set of the wireless communication devices 103-104.

The second network data comprises network operational measurements (OMs), such as RAN OMs. For example, the second network data could comprise forward link slot utilization, which comprises the number of timeslots used in the forward link of wireless communication network 110 while the second set of wireless communication devices 103-104 were receiving the wireless communication service. The forward link slot utilization could comprise the average overhead and data for a sector serving one or more of the second set of wireless communication devices 103-104.

The second network data could also comprise an amount of forward link data transmitted, which may be determined by the amount of megabytes transmitted over the forward link of wireless communication network 110, for example. The second network data could also comprise an average number of connections or users, wherein the average numbers of connections may be determined per cell site or per sector, or both. The second network data could also comprise a backhaul link load. The second network data could also comprise an amount of contention, wherein the amount of contention comprises a Number of Scheduled Eligible Users (NSEUs). The NSEUs are the number of users utilizing a sector or cell site simultaneously. The amount of contention, or NSEUs, may be determined per cell site or per sector, or both.

Service monitoring system 109 then processes the second network data with the wireless communication service model to generate model performance data for the wireless communication service provided to the second set of wireless communication devices 103-104, and compares the model performance data to the second performance data to validate the wireless communication service model (206). The model performance data comprises predictive performance data for the second set of wireless communication devices 103-104. The wireless communication service model is validated by comparing the predictive model performance data to the actual second performance data experienced by the second set of wireless communication devices 103-104. In one example, comparing the model performance data to the second performance data comprises determining that a difference between the model performance data and the second performance data is within a threshold. For example, a threshold accuracy of 85% may be set, which would require the model performance data to be at least 85% accurate with regard to the second performance data.

Wireless communication network 110 provides the wireless communication service to a third set of the wireless communication devices 105-107 located in a third set of geographic areas 122 and determines third network data for the wireless communication service provided to the third set of the wireless communication devices 105-107 (207). The third network data comprises network operational measurements (OMs), such as RAN OMs. For example, the third network data could comprise forward link slot utilization, which comprises the number of timeslots used in the forward link of wireless communication network 110 while the third set of wireless communication devices 105-107 were receiving the wireless communication service. The forward link slot utilization could comprise the average overhead and data for a sector serving one or more of the third set of wireless communication devices 105-107.

The third network data could also comprise an amount of forward link data transmitted, which may be determined by the amount of megabytes transmitted over the forward link of wireless communication network 110, for example. The third network data could also comprise an average number of connections or users, wherein the average numbers of connections may be determined per cell site or per sector, or both. The third network data could also comprise a backhaul link load. The third network data could also comprise an amount of contention, wherein the amount of contention comprises a Number of Scheduled Eligible Users (NSEUs). The NSEUs are the number of users utilizing a sector or cell site simultaneously. The amount of contention, or NSEUs, may be determined per cell site or per sector, or both.

Service monitoring system 109 then processes the third network data with the wireless communication service model to generate validated performance data for the wireless communication service provided to the third set of wireless communication devices 105-107 (208). The validated performance data comprises estimated performance data for the third set of wireless communication devices 105-107 as determined by the validated wireless communication service model.

Advantageously, the validated wireless communication service model allows a service provider to input network data for any cell site or sector and output validated performance data for a wireless communication device serviced by that respective cell site or sector. By utilizing the validated model, a service provider can accurately predict user experience, which allows the service provider to verify compliance with a service level agreement (SLA). For example, if a service provider has an SLA to provide a user with wireless communication service between 600 kilobits per second and 1.4 megabits per second for the forward link, the service provider may use the wireless communication service model to predict the actual customer experience with great accuracy. In utilizing the wireless communication service model, a service provider may determine that a customer did not receive wireless service consistent with a promised SLA, and thus may choose to bill the customer for a lower level of service or issue a bill credit. If, however, the service provider determines that a customer did receive wireless service consistent with a promised SLA, the service provider may confidently bill that customer the full amount for that SLA.

Figure 3:
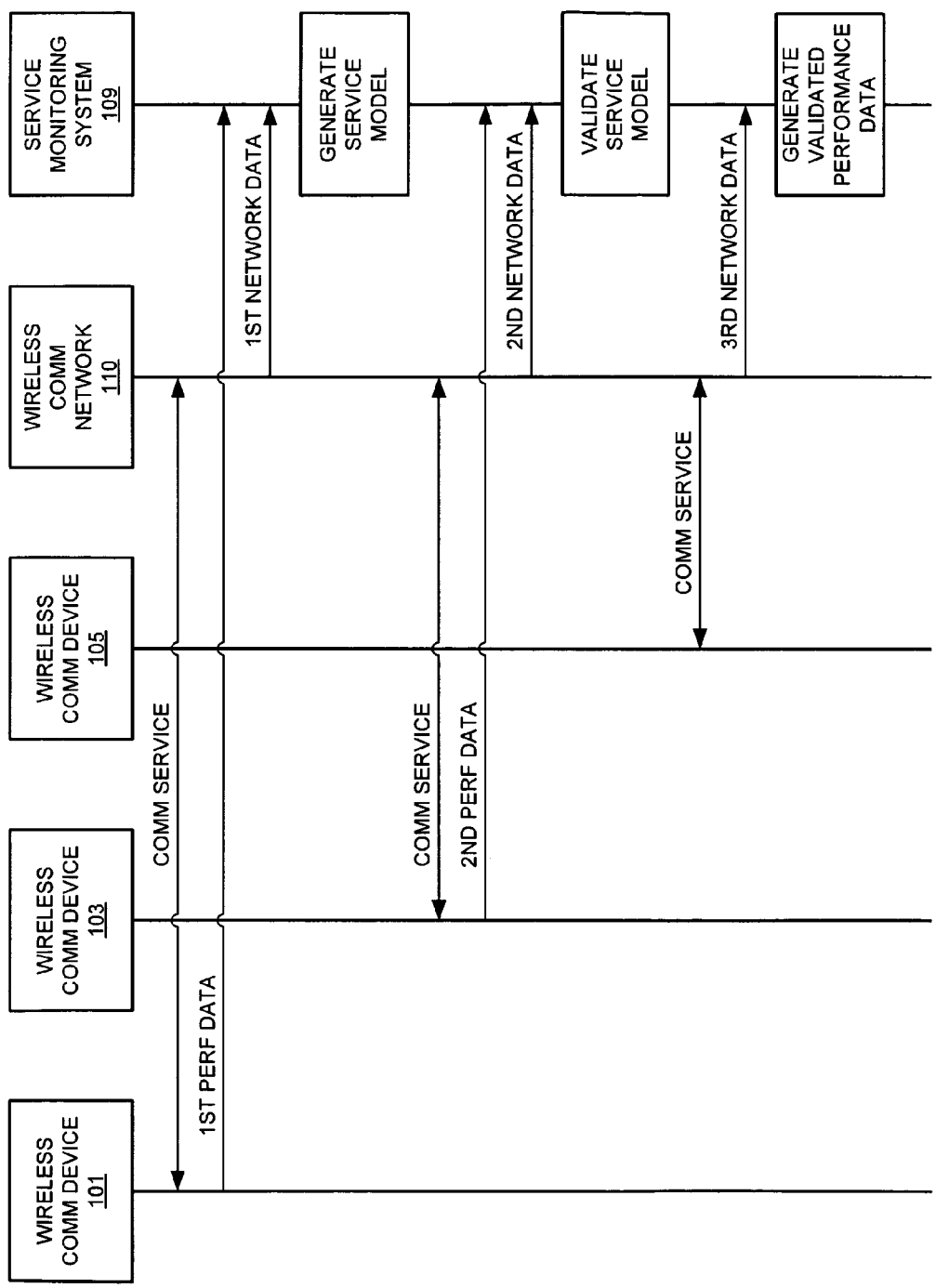
FIG. 3 is a sequence diagram that illustrates an operation of the wireless communication system.

FIG. 3 is a sequence diagram that illustrates an operation of wireless communication system 100. The sequence diagram of FIG. 3 only depicts a single wireless communication device from each geographic area 120-122 for clarity, but one of skill in the art will understand that many more wireless communication devices would typically be employed.

A wireless communication service is initiated between wireless communication device 101 and wireless communication network 110. Wireless communication device 101 is of a first set of wireless communication devices 101-102 located in a first geographic area 120. Wireless communication device 101 determines first performance data for the wireless communication service, and transfers the first performance data to service monitoring system 109. The first performance data for the wireless communication service could comprises a data transfer rate or a bandwidth measurement, such as kilobits per second. Wireless communication device 101 may perform data transfers on a periodic schedule, for example on an hourly basis. Wireless communication device 101 may perform multiple data transfers over multiple protocols, such as ftp or http. For example, wireless communication device 101 could stream video content over http from wireless communication network 110 and report the data transfer rate to service monitoring system 109. In another example, wireless communication device 101 could upload a file via ftp to communication network 110 and report the bandwidth of the file transfer to service monitoring system 109.

Wireless communication network 110 determines first network data for the wireless communication service provided to wireless communication device 101. Wireless communication network 110 then transfers the first network data to service monitoring system 109.

The first network data comprises network operational measurements (OMs), such as RAN OMs. For example, the first network data could comprise forward link slot utilization, which comprises the number of timeslots used in the forward link of wireless communication network 110 while wireless communication device 101 was receiving the wireless communication service. The forward link slot utilization could comprise the average overhead and data for a sector serving wireless communication device 101. The first network data could also comprise an amount of forward link data transmitted, which may be determined by the amount of megabytes transmitted over the forward link of wireless communication network 110, for example. The first network data could also comprise an average number of connections or users, wherein the average numbers of connections may be determined per cell site or per sector, or both. The first network data could also comprise a backhaul link load. The first network data could also comprise an amount of contention, wherein the amount of contention comprises a Number of Scheduled Eligible Users (NSEUs). The NSEUs are the number of users utilizing a sector or cell site simultaneously. The amount of contention, or NSEUs, may be determined per cell site or per sector, or both.

Service monitoring system 109 processes the first performance data and the first network data to generate a wireless communication service model. The wireless communication service model comprises a mathematical model that may be used to predict the application layer experience of users connected to wireless communication network 110. The wireless communication service model is generated by using the first performance data and the first network data to train a nonlinear predictive model using curve fitting techniques such as regression analysis and best fit. The first performance data and the first network data may be normalized prior to generating the wireless communication service model. Normalizing the first performance data and the first network data comprises assigning different weights to the various statistics within the first performance data and the first network data.

A wireless communication service is initiated between wireless communication device 103 and wireless communication network 110. Wireless communication device 103 is of a second set of wireless communication devices 103-104 located in a second geographic area 121. Wireless communication device 103 determines second performance data for the wireless communication service, and transfers the second performance data to service monitoring system 109. The second performance data for the wireless communication service could comprises a data transfer rate or a bandwidth measurement, such as kilobits per second. Wireless communication device 103 may perform data transfers on a periodic schedule, for example on an hourly basis. Wireless communication device 103 may perform multiple data transfers over multiple protocols, such as ftp or http. For example, wireless communication device 103 could stream video content over http from wireless communication network 110 and report the data transfer rate to service monitoring system 109. In another example, wireless communication device 103 could upload a file via ftp to communication network 110 and report the bandwidth of the file transfer to service monitoring system 109.

Wireless communication network 110 determines second network data for the wireless communication service provided to wireless communication device 101. Wireless communication network 110 then transfers the second network data to service monitoring system 109.

The second network data comprises network operational measurements (OMs), such as RAN OMs. For example, the second network data could comprise forward link slot utilization, which comprises the number of timeslots used in the forward link of wireless communication network 110 while wireless communication device 103 was receiving the wireless communication service. The forward link slot utilization could comprise the average overhead and data for a sector serving wireless communication device 103. The second network data could also comprise an amount of forward link data transmitted, which may be determined by the amount of megabytes transmitted over the forward link of wireless communication network 110, for example. The second network data could also comprise an average number of connections or users, wherein the average numbers of connections may be determined per cell site or per sector, or both. The second network data could also comprise a backhaul link load. The second network data could also comprise an amount of contention, wherein the amount of contention comprises a Number of Scheduled Eligible Users (NSEUs). The NSEUs are the number of users utilizing a sector or cell site simultaneously. The amount of contention, or NSEUs, may be determined per cell site or per sector, or both.

Service monitoring system 109 then validates the wireless communication service model. To validate the wireless communication service model, service monitoring system 109 processes the second network data with the wireless communication service model to generate model performance data for the wireless communication service provided to wireless communication device 103, and compares the model performance data to the second performance data. The model performance data comprises predictive performance data for wireless communication device 103. The wireless communication service model is validated by comparing the predictive model performance data to the actual second performance data experienced by wireless communication device 103.

A wireless communication service is initiated between wireless communication device 105 and wireless communication network 110. Wireless communication device 105 is of a third set of wireless communication devices 105-107 located in a third geographic area 122. Wireless communication network 110 provides the wireless communication service to wireless communication device 105 and determines third network data for the wireless communication service provided to wireless communication device 105. The third network data comprises network operational measurements (OMs), such as RAN OMs. For example, the third network data could comprise forward link slot utilization, which comprises the number of timeslots used in the forward link of wireless communication network 110 while wireless communication device 105 was receiving the wireless communication service. The forward link slot utilization could comprise the average overhead and data for a sector serving wireless communication device 105.

The third network data could also comprise an amount of forward link data transmitted, which may be determined by the amount of megabytes transmitted over the forward link of wireless communication network 110, for example. The third network data could also comprise an average number of connections or users, wherein the average numbers of connections may be determined per cell site or per sector, or both. The third network data could also comprise a backhaul link load. The third network data could also comprise an amount of contention, wherein the amount of contention comprises a Number of Scheduled Eligible Users (NSEUs). The NSEUs are the number of users utilizing a sector or cell site simultaneously. The amount of contention, or NSEUs, may be determined per cell site or per sector, or both.

Service monitoring system 109 then processes the third network data with the wireless communication service model to generate validated performance data for the wireless communication service provided to wireless communication device 105. The validated performance data comprises estimated performance data for wireless communication device 105 as determined by the validated wireless communication service model.

Advantageously, the validated wireless communication service model allows a service provider to input network data for any cell site or sector and output validated performance data for a wireless communication device serviced by that respective cell site or sector. By utilizing the validated model, a service provider can accurately predict user experience, which allows the service provider to verify compliance with a service level agreement (SLA). For example, if a service provider has an SLA to provide a user with wireless communication service between 600 kilobits per second and 1.4 megabits per second for the forward link, the service provider may use the wireless communication service model to predict the actual customer experience with great accuracy. In utilizing the wireless communication service model, a service provider may determine that a customer did not receive wireless service consistent with a promised SLA, and thus may choose to bill the customer for a lower level of service or issue a bill credit. If, however, the service provider determines that a customer did receive wireless service consistent with a promised SLA, the service provider may confidently bill that customer the full amount for that SLA.

Figure 4:
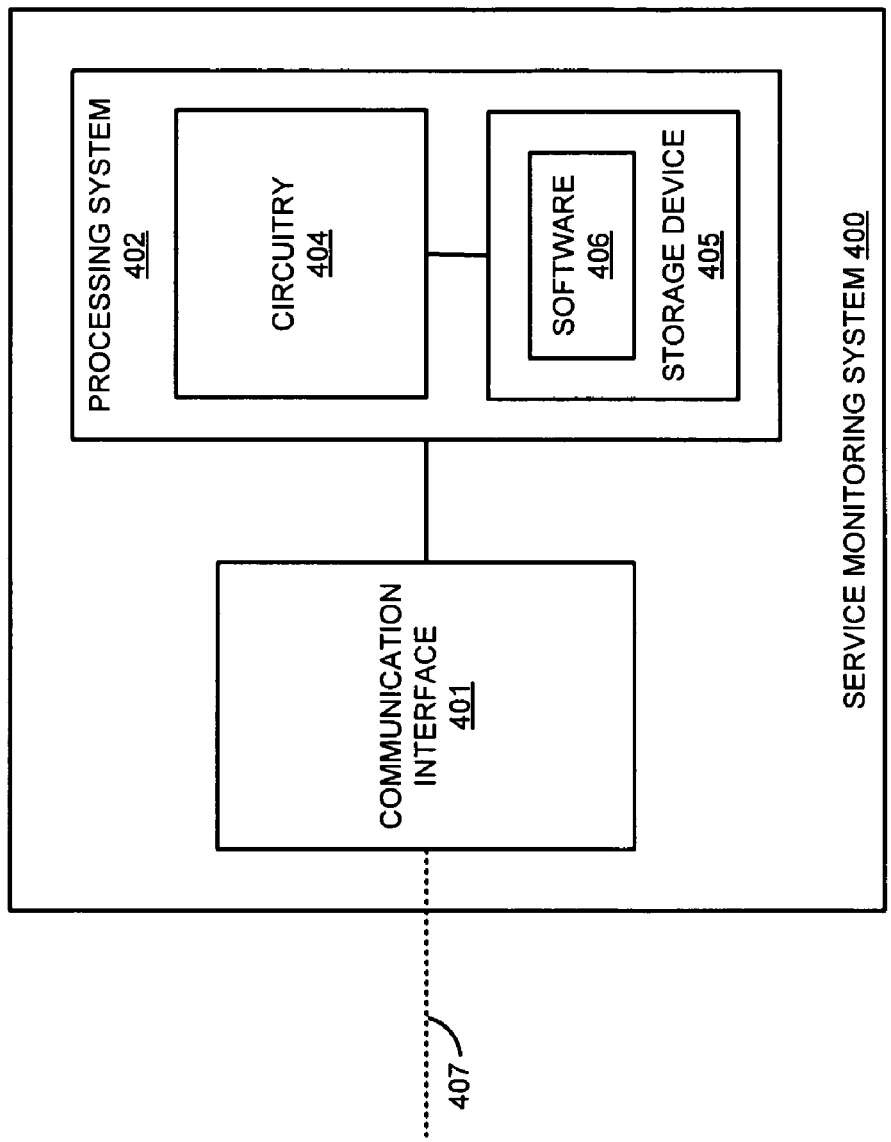
FIG. 4 is a block diagram that illustrates a service monitoring system.

FIG. 4 is a block diagram that illustrates service monitoring system 400. Service monitoring system 400 provides an example of service monitoring system 109, although system 109 may use other configurations. Service monitoring system 400 comprises communication interface 401 and processing system 402. Processing system 402 is linked to communication interface 401. Processing system 402 includes circuitry 404 and storage device 405 that stores operating software 406.

Communication interface 401 comprises components that transmit and receive communication signals over communication link 407 under the control of processing system 402. These components include transceiver and signal processing circuitry. The received communication signals include first performance data, second performance data, first network data, second network data, and third network data.

Circuitry 404 comprises microprocessor and associated circuitry that retrieves and executes operating software 406 from storage device 405. Storage device 405 comprises a disk drive, flash drive, memory circuitry, or some other memory device. Operating software 406 comprises computer programs, firmware, or some other form of machine-readable processing instructions. Although storage device 405 is shown within service monitoring system 400, a portion of storage device 405 could be externally located. For example, storage device 405 may comprise an external memory apparatus that stores software 406 for subsequent transfer to an internal memory device within service monitoring system 400.

When executed by circuitry 404, operating software 406 directs processing system 402 to operate service monitoring system 400 as described herein. In particular, operating software 406 directs processing system 402 to process the first performance data and the first network data to generate a wireless communication service model, process the second network data with the wireless communication service model to generate model performance data for a wireless communication service provided to a second set of wireless communication devices, compare the model performance data to the second performance data to validate the wireless communication service model, and process the third network data with the wireless communication service model to generate validated performance data for a wireless communication service provided to a third set of wireless communication devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of monitoring a wireless communication service provided by a wireless communication network to wireless communication devices in a plurality of geographic areas, the method comprising:
   in a first set of the wireless communication devices located in a first set of the geographic areas, receiving the wireless communication service and determining first performance data for the wireless communication service;
   in the wireless communication network, providing the wireless communication service to the first set of the wireless communication devices and determining first network data for the wireless communication service provided to the first set of the wireless communication devices;
   in a service monitoring system, processing the first performance data and the first network data to generate a wireless communication service model;
   in a second set of the wireless communication devices located in a second set of the geographic areas, receiving the wireless communication service and determining second performance data for the wireless communication service;
   in the wireless communication network, providing the wireless communication service to the second set of the wireless communication devices and determining second network data for the wireless communication service provided to the second set of the wireless communication devices;
   in the service monitoring system, processing the second network data with the wireless communication service model to generate model performance data for the wireless communication service provided to the second set of the wireless communication devices, and comparing the model performance data to the second performance data to validate the wireless communication service model;
   in the wireless communication network, providing the wireless communication service to a third set of the wireless communication devices located in a third set of the geographic areas and determining third network data for the wireless communication service provided to the third set of the wireless communication devices; and
   in the service monitoring system, processing the third network data with the wireless communication service model to generate validated performance data for the wireless communication service provided to the third set of the wireless communication devices.

2. The method of claim 1 wherein the first performance data and the second performance data comprises a data transfer rate.

3. The method of claim 1 wherein the first performance data and the second performance data comprises a bandwidth measurement.

4. The method of claim 1 wherein the first network data and the second network data comprises forward link slot utilization.

5. The method of claim 1 wherein the first network data and the second network data comprises an amount of forward link data transmitted.

6. The method of claim 1 wherein the first network data and the second network data comprises an average number of connections.

7. The method of claim 1 wherein the first network data and the second network data comprises a backhaul link load.

8. The method of claim 1 wherein the first network data and the second network data comprises an amount of contention.

9. The method of claim 8 wherein the amount of contention comprises a Number of Scheduled Eligible Users (NSEUs).

10. The method of claim 1 wherein comparing the model performance data to the second performance data comprises determining that a difference between the model performance data and the second performance data is within a threshold.

11. A wireless communication system for monitoring a wireless communication service provided by a wireless communication network to wireless communication devices in a plurality of geographic areas, the system comprising:
   a first set of the wireless communication devices located in a first set of the geographic areas configured to receive the wireless communication service and determine first performance data for the wireless communication service;

the wireless communication network configured to provide the wireless communication service to the first set of the wireless communication devices and determine first network data for the wireless communication service provided to the first set of the wireless communication devices;

a service monitoring system configured to process the first performance data and the first network data to generate a wireless communication service model;

a second set of the wireless communication devices located in a second set of the geographic areas configured to receive the wireless communication service and determine second performance data for the wireless communication service;

the wireless communication network configured to provide the wireless communication service to the second set of the wireless communication devices and determine second network data for the wireless communication service provided to the second set of the wireless communication devices;

the service monitoring system configured to process the second network data with the wireless communication service model to generate model performance data for the wireless communication service provided to the second set of the wireless communication devices, and compare the model performance data to the second performance data to validate the wireless communication service model;

the wireless communication network configured to provide the wireless communication service to a third set of the wireless communication devices located in a third set of the geographic areas and determine third network data for the wireless communication service provided to the third set of the wireless communication devices; and the service monitoring system configured to process the third network data with the wireless communication service model to generate validated performance data for the wireless communication service provided to the third set of the wireless communication devices.

12. The system of claim 11 wherein the first performance data and the second performance data comprises a data transfer rate.

13. The system of claim 11 wherein the first performance data and the second performance data comprises a bandwidth measurement.

14. The system of claim 11 wherein the first network data and the second network data comprises forward link slot utilization.

15. The system of claim 11 wherein the first network data and the second network data comprises an amount of forward link data transmitted.

16. The system of claim 11 wherein the first network data and the second network data comprises an average number of connections.

17. The system of claim 11 wherein the first network data and the second network data comprises a backhaul link load.

18. The system of claim 11 wherein the first network data and the second network data comprises an amount of contention.

19. The system of claim 18 wherein the amount of contention comprises a Number of Scheduled Eligible Users (NSEUs).

20. The system of claim 11 wherein the service monitoring system configured to compare the model performance data to the second performance data comprises the service monitoring system configured to determine that a difference between the model performance data and the second performance data is within a threshold.

* * * * *